United States Patent [19]

Baker

[11] Patent Number: 5,191,759
[45] Date of Patent: Mar. 9, 1993

[54] BASECUTTER GEARBOX FOR A SUGAR CANE HARVESTER

[75] Inventor: Malcolm J. Baker, Bundaberg, Australia

[73] Assignee: Austoft Industries Limited, North Bundaberg, Australia

[21] Appl. No.: 746,391

[22] Filed: Aug. 16, 1991

[30] Foreign Application Priority Data

Aug. 17, 1990 [AU] Australia ............................... PK1809

[51] Int. Cl.$^5$ ............................................. A01D 45/10
[52] U.S. Cl. ........................................ 56/500; 56/53; 56/503
[58] Field of Search ....................... 56/53, 60, 63, 101, 56/102, 500, 502, 13.5, 17.5

[56] References Cited

U.S. PATENT DOCUMENTS 4,383,536  5/1983  Delorme ........................... 56/503 X

FOREIGN PATENT DOCUMENTS 2459883  7/1976  Fed. Rep. of Germany ........... 56/53
3529231  4/1986  Fed. Rep. of Germany ......... 56/500

OTHER PUBLICATIONS

Toft Bros. Industries Ltd. drawing No. 83024900 Nov. 1976.
Toft Bros. Industries Ltd. drawing No. 86305160 Dec. 1976.

Primary Examiner—David J. Bagnell
Attorney, Agent, or Firm—Weil, Gotshal & Manges

[57] ABSTRACT

A sugar cane harvester in which the base cutting assembly is configured and mounted to the harvester so as to allow convenient removal and/or servicing of the base cutting assembly. The base cutting assembly has a gearbox which extends across the space between the side walls, above a path along which the sugar cane is caused to move, and which projects beyond at least one of the side walls; a pair of drive shafts which extend downwardly from the gearbox in the space between the side walls, with each of the drive shafts carrying base cutting blades; and a motor for driving the base cutting assembly which is mounted to the outwardly projecting part of the gearbox. The base cutting assembly may be mounted to one or both of the side walls, preferably with fasteners and onto a mounting provided on the side walls. One or both of the side walls may have a cutaway portion which allows the base cutting assembly to be withdrawn laterally from between the side walls for servicing.

2 Claims, 4 Drawing Sheets

BASECUTTER GEARBOX FOR A SUGAR CANE HARVESTER

FIELD OF THE INVENTION

The present invention relates to an improved sugar cane harvester and in particular to such a sugar cane harvester having an improved base cutter assembly.

DESCRIPTION OF PRIOR ART

It is known to produce sugar cane harvesters with a frame which includes a pair of spaced apart plate-like sidewalls, which normally lie in parallel planes. These frame sidewalls are used to support at least the base cutter assembly, the feed rollers and the billet cutting means of the sugar cane harvester. It has been conventional, in one form of such harvesters, to mount a base cutter assembly including a motor, a gearbox, drive shafts and base cutting blades totally between the frame sidewalls. This arrangement has proven to be inconvenient for the servicing of the base cutter assembly and has also made other design modifications difficult to achieve in view of the very limited space between the frame sidewalls. This prior art arrangement also suffered from the problem that the base cutter assembly was designed to nest closely between the frame sidewalls. In practice it was frequently found that the sidewalls were too close together to fit the gearbox between them. This necessitated the jacking apart of the sidewalls to fit the gearbox in. Jacking was then also required to remove the gearbox for servicing.

SUMMARY OF THE INVENTION

According to the present invention in a sugar cane harvester of the type having a frame including a pair of spaced apart plate-like sidewalls between which are mounted a base cutting assembly, feed rollers and billet cutting means which together define a path for the passage of sugar cane through the harvester, the improvement in which the base cutter assembly comprises a gearbox mounted to extend across the space between the sidewalls, above the path for the sugar cane, and to project beyond at least one of these sidewalls, a pair of spaced apart drive shafts extending downwardly from the gearbox in the space between the sidewalls, each driveshaft carrying at or adjacent its lower end base cutting blade means, a motor for driving the base cutter assembly being mounted on the gearbox where it projects beyond one of the sidewalls.

The projection of the gearbox laterally beyond at least one of the sidewalls and the mounting of the motor on that projection allows the motor to be more readily accessed for service. It also places the motor in a less congested part of the sugar cane harvester. This arrangement would normally be dismissed by those skilled in the art as the placing of the motor further from the drive shafts necessitates the use of additional gear wheels in the gearbox drive train. It has been found by the present inventors, however, that this disadvantage is outweighed by the advantages that accrue from the use of the present invention.

The base cutter assembly gearbox is preferably connected to the sidewalls of the frame by being bolted to mountings welded onto the sidewalls. The sidewall beyond which the gearbox projects is preferably cut away on its lower edge so that the lower edge rises up on either side of the gearbox and runs across the upper surface of the gearbox. This arrangement allows removal of the whole base cutter assembly by supporting the base cutter assembly on a suitable trolley, unbolting the gearbox from its mountings and sliding the base cutting assembly laterally out of the sugar cane harvester through the cut away portion of the respective sidewall. If the sugar cane harvester is fitted with full tracks rather than wheels it may not be possible to remove the gearbox as described above without removing one of the track assemblies. In this case the motor may be removed first, the gearbox unbolted and mounted on a trolley as described above, and one end of the gearbox is moved outwardly of the machine through the cut out, the other end of the gearbox is pulled forwardly and the gearbox removed out of the throat of the sugar cane harvester.

BRIEF DESCRIPTION OF THE DRAWINGS

Hereinafter given by way of example only is a preferred embodiment of the present invention described with reference to the accompanying drawings in which.

PREFERRED EMBODIMENT OF THE INVENTION

Figure 1:
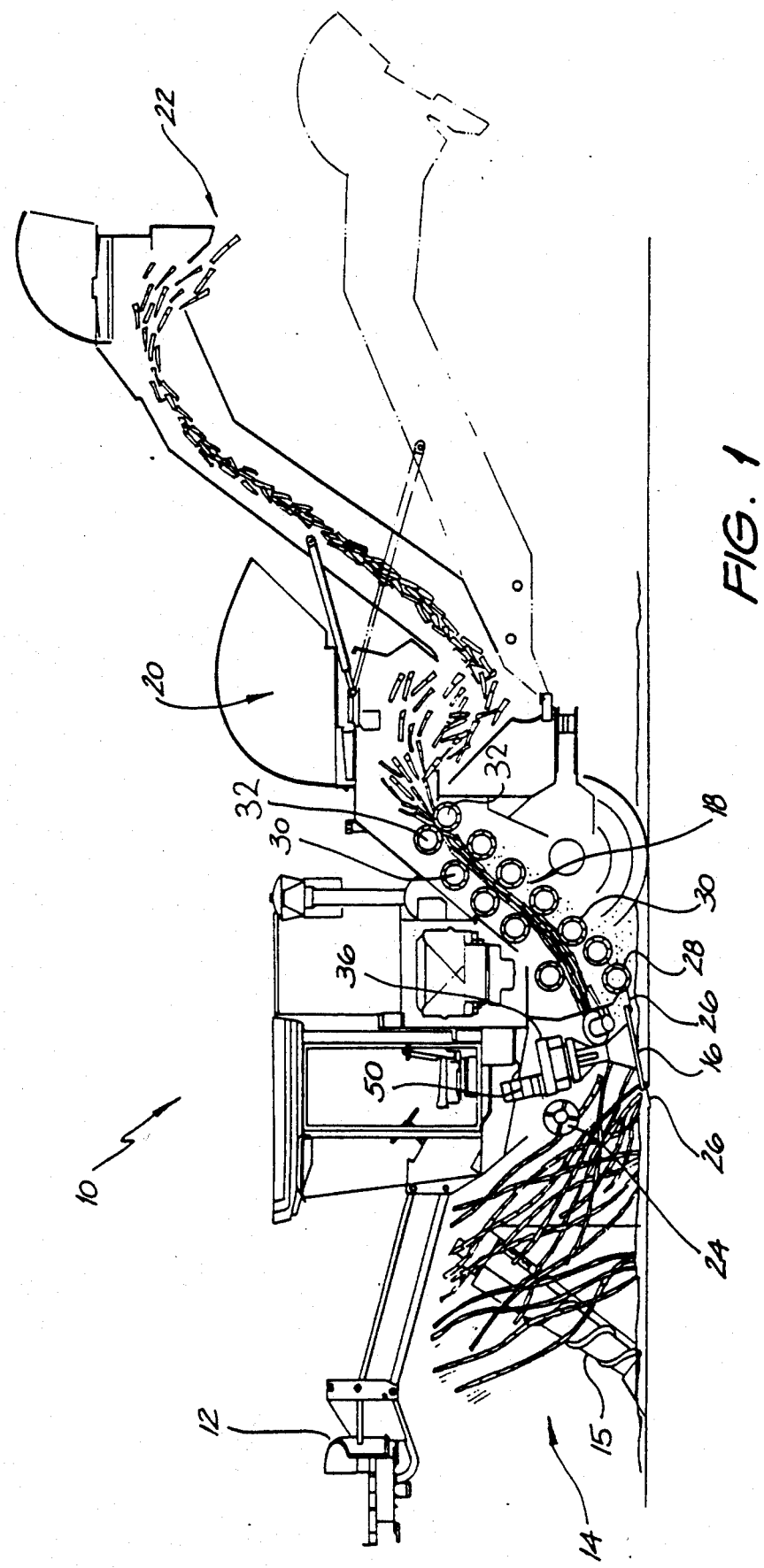
FIG. 1 is a partly cut-away side elevational view of a sugar cane harvester according to the present invention.

A cane harvester is shown generally at 10 in FIG. 1. The harvester 10 comprises a topper assembly shown at 12, a crop gathering and dividing area generally shown at 14, crop divider rollers 15, a base cutter assembly generally shown at 16, a feeding area generally shown at 18, a cleaning area generally shown at 20 and an elevating and discharging area generally shown at 22.

The throat area of the harvester 10 includes a top roller 24 and the cutter discs 26 of the base cutter assembly 16. A butt roller 28 is mounted immediately behind the cutter discs 26. The feeding area includes feed rollers 30 which lead to the chopper drums 32.

Figure 2:
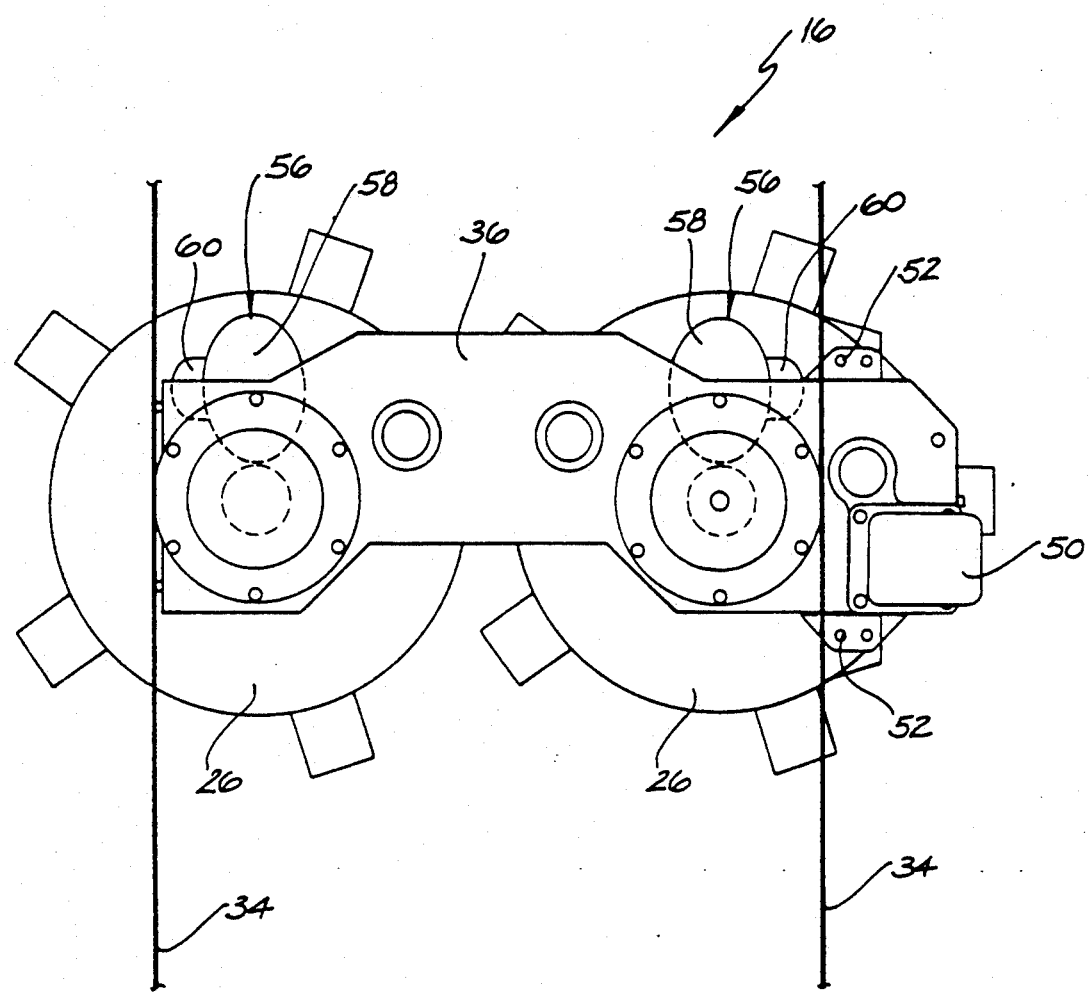
FIG. 2 is a plan view of the base cutting assembly of the sugar cane harvester of FIG. 1.
Figure 4:
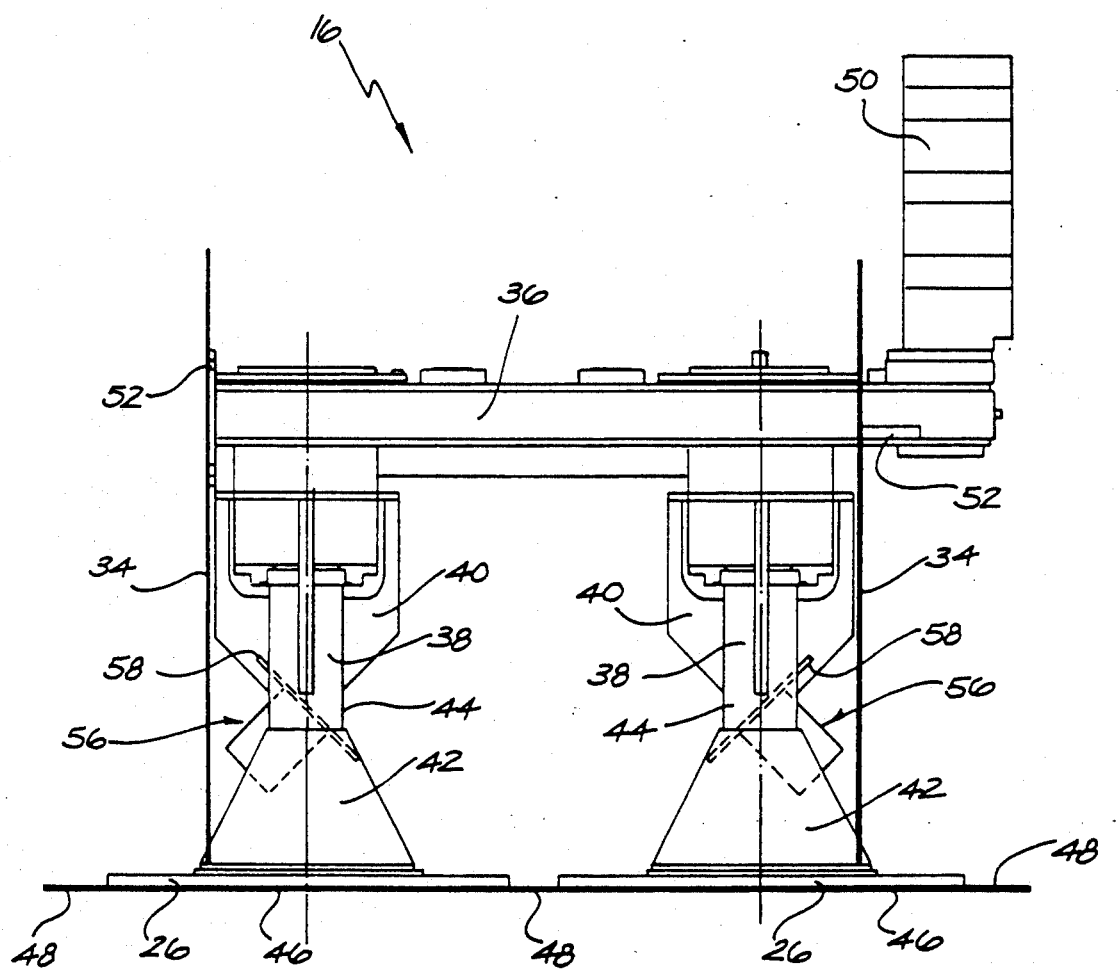
FIG. 4 is a front elevational view of the base cutting assembly of FIG. 2.

The foregoing components are supported on a frame which includes a pair of substantially parallel, spaced-apart, sidewalls 34 (best seen in FIGS. 2 and 4). The sidewalls 34, the top roller 24, the base cutter assembly 16, the feed rollers 30 and the chopper drums 32 define a path for the passage of the sugar cane through the harvester 10.

The base cutter assembly 16 includes a base cutter gearbox 36 extending horizontally between the sidewalls 34 above the path for the sugar cane and projecting beyond the left hand side one of them. A pair of drive shafts 38 extend downwardly from the gearbox 36. Each drive shaft is provided with an array of essentially triangular paddles 40 spaced around the circumference of the upper end of the drive shaft 38 and with a cone 42 surrounding the lower end of the drive shaft 38. Each drive shaft 38 thus has an "hour-glass" shape with a waist 44 which is a region of minimum effective diameter of the drive shaft 38. Each drive shaft 38 is provided at its free end with a base cutting disc 46 contiguous with the cone 42. Each of the base cutting discs 46 has arranged around its periphery a number of spaced apart base cutting blades 48.

Figure 3:
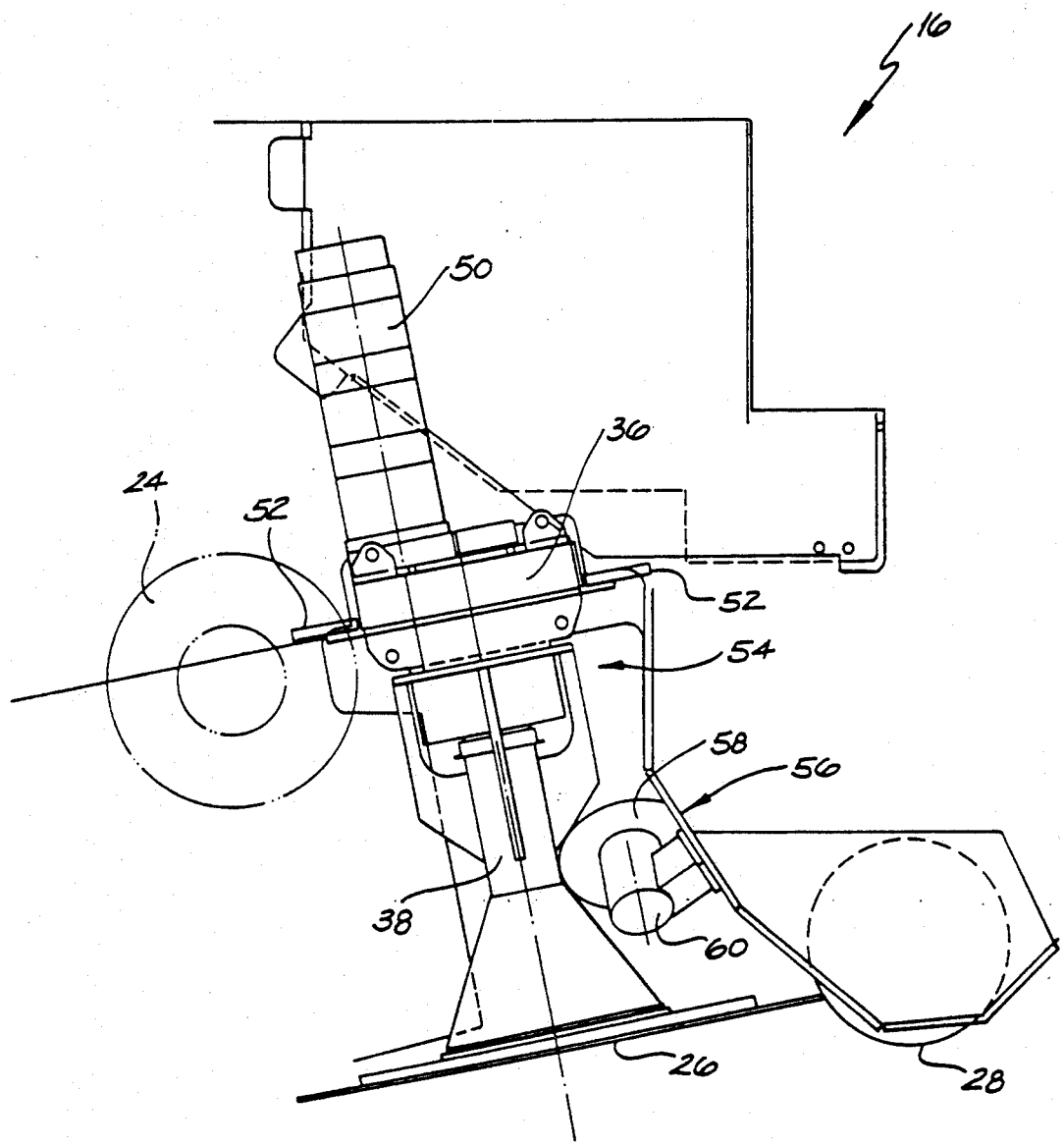
FIG. 3 is a side elevational view of the base cutting assembly of FIG. 2.

The base cutting assembly 16 is driven by an hydraulic motor 50 mounted on that part of the gearbox 36 which projects beyond the sidewall 34. The motor 50 is driven by a supply of pressurised hydraulic fluid (not shown) in a manner well known in the art. The base cutter gearbox 36 is mounted on the frame sidewalls 34 by fastening means in the form of bolts engaging with mounting means in the form of mountings 52 welded to the sidewalls 34. The left hand one of the sidewalls 34 is cut-away along its lower edge such that the lower edge rises up above the gearbox 36. This defines an upwardly extending aperture 54 (see FIG. 3) through which the base cutter assembly 16 may be laterally withdrawn from the sugar cane harvester 10, for service. The fact that the motor 50 is positioned laterally outwardly of the adjacent sidewall 34 means, however, that it may be readily accessed for service without removal of the whole base cutter assembly 16 from the cane harvester 10.

Trash cleaning means 56 are mounted adjacent the waist 44 of each of the drive shafts 38. Each trash cleaning means 56 includes a disc 58 mounted on an axially extending shaft (not shown) which is rotatably supported in a bearing 60 attached to a respective one of the sidewalls 34. The disc 58 lies at an acute angle to the axis of the drive shaft 38. The disc 58 serves to engage trash which has a tendency to wrap around the drive shaft 38 and directing it away from the shaft and into the cane harvester.

It will be recognised by persons skilled in the art that numerous variations and modifications may be made to the invention as described above without departing from the spirit or scope of the invention as broadly described.

I claim:

1. In a sugar cane harvester of the type having:
   a frame including a pair of spaced apart plate-like side walls between which are mounted a base cutting assembly and feed rollers and billet cutting means which together define a path for the passage of sugar cane through the harvester,
   the improvement in which the base cutting assembly comprises:
   a gear box mounted to each side wall with a fastening means which connects the gear box to a mounting means provided on each side wall such that the gear box extends across the space between the side walls, above the path for the sugar cane, and projects beyond at least one of the side walls, the side wall beyond which the gear box projects having a recess extending from a lower edge thereof which receives the projecting part of the gearbox and allows the base cutting assembly to be moved laterally outwards from between the side walls of the harvester and through the recess for servicing;
   a pair of spaced apart drive shafts extending downwardly from the gear box in the space between the side walls;
   base cutting blade means carried at or adjacent a lower end of each of the drive shafts, and
   a motor for driving the base cutting assembly being mounted on the gear box where it projects beyond the said one of the side walls so as to be on the outside of the space between the side walls.

2. The harvester of claim 1 wherein the recess is defined by a cut-away portion.

* * * * *